United States Patent [19]

Raven

[11] 4,174,639

[45] Nov. 20, 1979

[54] BRIDGE CIRCUITS

[75] Inventor: John Raven, Prospect, Conn.

[73] Assignee: American Chain & Cable Company, Inc., Bridgeport, Conn.

[21] Appl. No.: 893,937

[22] Filed: Apr. 6, 1978

[51] Int. Cl.² .............................................. G01B 7/18
[52] U.S. Cl. .................................................... 73/766
[58] Field of Search ................... 73/88.5 SD, 88.5 R, 73/708, 765, 766; 324/105, 131

[56] References Cited

U.S. PATENT DOCUMENTS

| 3,278,834 | 10/1966 | Perino | 324/105 |
| 3,518,886 | 7/1970 | Talmo et al. | 73/88.5 X |
| 3,646,815 | 3/1972 | Martin et al. | 73/727 |
| 3,859,594 | 1/1975 | Grindheim | 73/88.5 X |

Primary Examiner—Charles A. Ruehl
Attorney, Agent, or Firm—Pennie & Edmonds

[57] ABSTRACT

Improved bridge circuits are described for offsetting span errors, for making scale adjustments and for providing for a non-linear output.

20 Claims, 3 Drawing Figures

BRIDGE CIRCUITS

CROSS-REFERENCE TO RELATED APPLICATIONS

The following applications are hereby incorporated by reference in this application: U.S. application Ser. No. 885,079, filed Mar. 9, 1978, by Birger Gabrielson for "Differential Pressure Sensor with Dual Level Overrange Protection" and U.S. application Ser. No. 886,118, filed Mar. 13, 1978, by Howard R. Branch, III for "Temperature Compensated Bridge Circuit", both of which are assigned to the assignee hereof.

BACKGROUND AND SUMMARY OF THE INVENTION

This relates to improved bridge circuits. Because the use of such circuits with strain gauges is of primary interest, the invention will be described in terms of such application. It will be recognized, however, that the principles disclosed may have application to other circuits.

A strain gauge is typically used by bonding it to a flexible object and measuring the change in voltage across the gauge or the change in gauge resistance as different loads are applied to the object. It is particularly advantageous to use a Wheatstone bridge in which two strain gauges are connected in series on one side of the bridge and two resistors are connected in series on the other side. Each of these four elements is in a separate diagonal of the bridge with the supply voltage applied to the nodes between the two sides of the bridge and the output voltage measured between the node between the two resistors and the node between the two strain gauges. Since the function of the two resistors is to provide a reference voltage at the node between them, their side of the bridge will be referred to as the reference side. If the gauges are mounted on opposite sides of the object so that bending of the object applies a tensile loading to one gauge and a compressive loading to the other, the changes in resistance of the gauges tend to be equal in magnitude but opposite in polarity. For these conditions, the ratio of the resistances of the two strain gauges is a function of the amount of deflection in the object. Hence, the output voltage can be related to the amount of deflection in the object.

Recent improvements in the art have led to increasing use of semiconductor strain gauges. As is well known, such strain gauges offer significant advantages over prior art foil or wire strain gauges since the sensitivity of the semiconductor gauges is hundreds of times greater than that of typical metallic gauges. However, semiconductor strain gauges have both a large temperature coefficient of resistance and a large temperature coefficient of gauge factor or sensitivity. Thus, both their resistance and their rate of change of resistance with applied stress vary appreciably with temperature. Semiconductor strain gauges can be made so that these temperature coefficients in different devices are approximately the same. However, when the gauges are bonded to an object, certain uncontrollable temperature induced strains are created that modify the temperature coefficients of the gauges. As a result, the voltage output from the bridge is a function of temperature.

Typically, this variation in output voltage because of changes in resistance with temperature is compensated by measuring the resistance of the gauges under zero stress at two temperatures and selecting a series/parallel network of resistance for one gauge which offsets the effects of its temperature coefficient of resistance enough that the ratio of the resistances in the two strain gauge diagonals at the two compensation temperatures is identical. This process is called temperature compensation. While this temperture compensation does improve the performance of the circuit as a measuring device, it does not guarantee that the resistance ratios are the same at any other temperature because of the complex effects of the temperature induced strain in the gauges. Moreover, no correction is made by this temperature compensation process for the variation in output voltage because of change in sensitivity with temperature.

The variation in output voltage because of change in sensitivity with temperature is compensated by introducing a resistor in series or parallel with the bridge. The value of this resistor is selected to balance the temperature coefficient of sensitivity. More particularly, once the bridge is temperature compensated at its two compensation temperatures, its output voltage is measured at these two temperatures with maximum deflection being applied to the object on which the gauges are mounted. A series or paralel resistor is then selected so that the output voltage under this condition is the same at both compensation temperatures. This process is called span compensation.

The above referenced patent application of Howard R. Branch, III, describes a method and circuit for achieving improved temperature compensation at three different temperatures. Thus, in a bridge circuit according to the Branch invention the ratio of the resistances in the two strain gauge diagonals is substantially the same at three different temperatures. This is accomplished by incorporating into the strain gauge side of the bridge both the span compensation resistor and the series/parallel network of temperature compensation resistors. While this technique does produce improved temperature compensation, span compensation is still only achieved at two temperatures. Between these two temperatures there typically is a non-zero span error.

It frequently is also desirable to suppress the zero output level from the bridge circuit. For example, it is common practice to use a two wire circuit both to supply power to the bridge circuit and to produce an output signal proportional to the output voltage of the bridge circuit. In such a case the output signal might vary from four to twenty milliamps. When the bridge circuit is used to measure pressure differential, the four milliamp output signal might correspond to zero pressure differential while the twenty milliamp output might correspond to a maximum pressure differential such as 200 pounds per square inch. If, however, the pressure range between 100 and 200 pounds per square inch is the only range of interest, it is desirable to modify the circuit output so that a four milliamp output corresponds to 100 pounds pressure differential instead of zero pressure differential. However, prior art techniques for making such modifications typically upset the resistance relations in the bridge which necessarily would destroy the temperature and span compensation provided for in the aforementioned application of Howard R. Branch, III.

In some applications it may also be desirable to provide an output signal which is not a linear function of the output voltage across the bridge. For example, it frequently is advantageous to provide an output signal which is the square root of the pressure differential that might be measured by a pair of strain gauges because the flow of fluid in a pipe is proportional to the square root of the pressure differential. However, the provision of such a function in the prior art typically requires relatively complicated circuitry.

I have devised circuits which provide for improved span compensation, scale adjustment, and non-linear output functions while being compatible with the temperature and span compensation described in the Branch application. Each circuit comprises a bridge circuit in one arm of which are first and second series connected electrical elements whose resistance varies as a function of at least two variables and in the other arm of which are third, fourth and fifth series connected electrical elements whose resistance is substantially constant with respect to said two variables under operating conditions. Illustratively, the first of the two variables is temperature and the second is stress.

To reduce span compensation errors, the circuit further comprises sixth and seventh series connected electrical elements which are connected between the input nodes of the bridge circuit, one of which elements has a positive temperature coefficient of resistance and the other of which has a negative coefficient of resistance with respect to a first one of said two variables. A first terminal of a voltage supply is connected to a first input node of the bridge circuit. A parallel combination of eighth and ninth electrical elements is connected between a second input node of the bridge circuit and a second terminal of the voltage supply. One of these two electrical elements has a positive temperature coefficient of resistance and the other a negative temperature coefficient of resistance with respect to said first variable. The sixth, seventh, eighth and ninth electrical elements are selected as detailed below to reduce span compensation errors at a third value of the first variable.

Each circuit further comprises output means, such as a high gain differential amplifier, having first and second input terminals, one of which is connected to a first output node of the bridge circuit located between said first and second electrical elements and the other of which is connected to a second output node of the bridge circuit located between said fourth and fifth electrical elements. Preferably, my circuit is used in a two wire system in which power is supplied to the circuit over the same two wires over which the output signal is transmitted. In such a system the output means is used to control current flow in said wires.

My invention also comprises a constant current source which is connected between the first output of the bridge circuit and a node between the third and fourth electrical elements. By varying the current from this source one can adjust the voltage at the output node in the reference arm of the bridge so that the minimum output signal does not correspond to the zero level in the variable being sensed by the bridge circuit. In contrast to prior art techniques of adjusting this voltage by changing the resistance values in the reference arm, the use of a constant current source facilitates the achievement of temperature and span compensation.

Alternatively, the constant current source may be used to calibrate a non-linear circuit. In this application a function generator and a feedback resistor are connected between an output terminal of the circuit and an input terminal to the differential amplifier. For this configuration the output signal from the differential amplifier is proportional to that function of the input signal which is the inverse of the function produced by the function generator. For example, the output of the differential amplifier is proportional to the square root of the input signal if the function generator is a squaring circuit. This type of function generator typically has a non-zero output at a point which corresponds to the zero level in the variable being sensed by the bridge circuit. Accordingly, it is necessary to compensate for this output by modifying the voltage applied to the differential amplifier. I have found that this may readily be accomplished by use of the constant current source in a similr fashion to its use in a linear circuit.

BRIEF DESCRIPTION OF THE DRAWING

The nature, advantages and various features of my invention will appear more fully upon consideration of the illustrative embodiments now to be described in detail in connection with the drawing in which:

FIG. 1 is a graph useful in understanding certain features of my invention; and

DETAILED DESCRIPTION OF THE INVENTION

Figure 1:
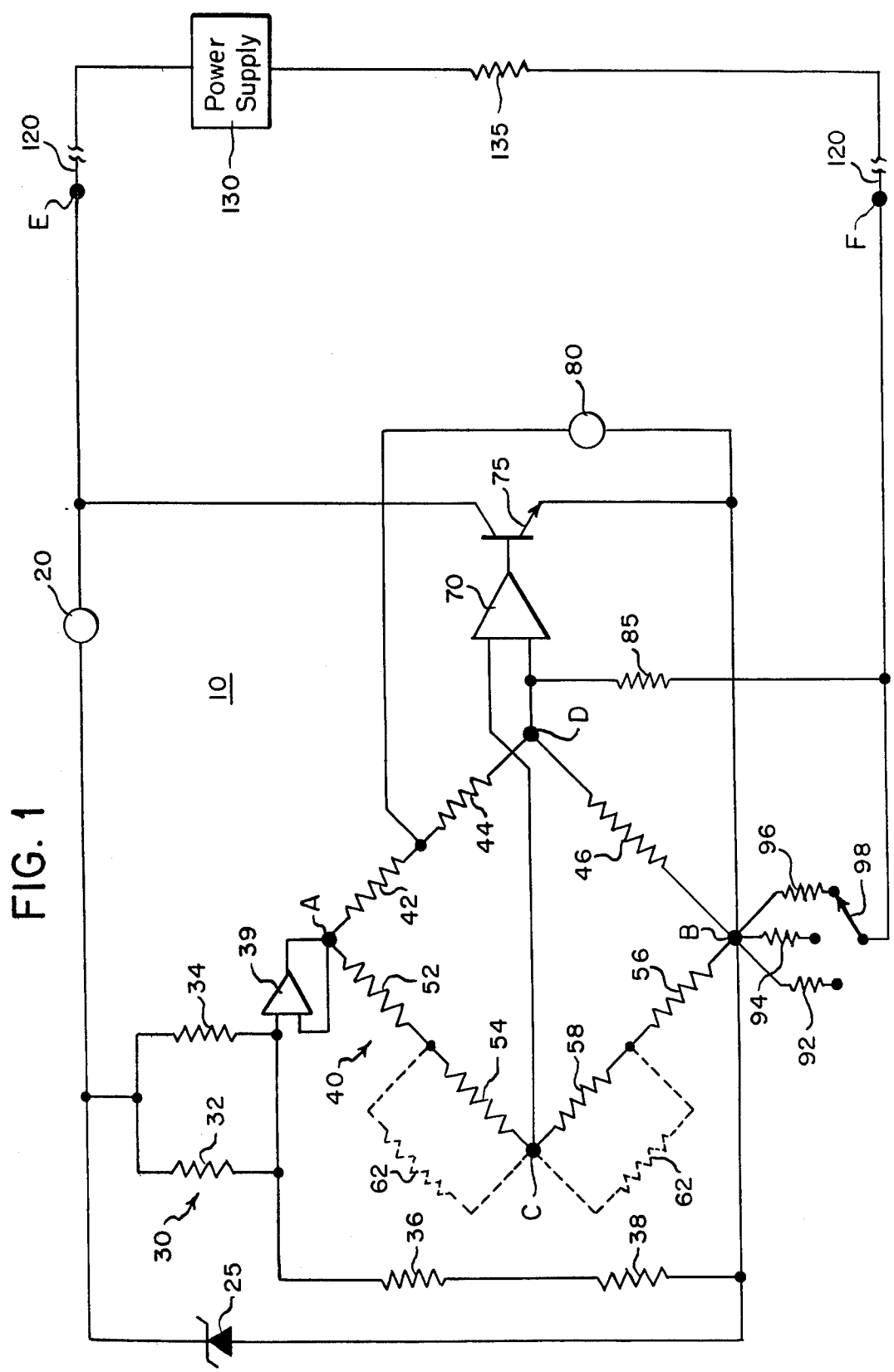
FIG. 1 is a block diagram of an illustrative embodiment of my invention.

In the illustrative embodiment of FIG. 1, circuit 10 comprises a first constant current source 20, a voltage regulator 25, a span compensation network 30, a temperature compensated bridge circuit 40, an amplifier 70, a transistor 75, a second constant current source 80, a feedback resistor 85 and scaling resistors 92, 94, 96. Circuit 10 is connected at terminals E and F to a two wire line 120 which connects a power supply 130 and a resistive load 135 to circuit 10. Power supply 130 provides all the necessary power to circuit 10 via two wire line 120. Using the same two wire line, the output of circuit 10 is transmitted in the form of a variable current back to load 135. There the variable signal is sensed as a voltage drop across the load.

First constant current source 20 is connected in series between terminal E and the voltage regulator which illustratively is a Zener diode. The other side of the voltage regulator is connected to node B of bridge circuit 40.

The span compensation network comprises a first resistor 32 and a first thermistor 34 connected in parallel between the regulated voltage source and a node A of bridge circuit 40 and a second resistor 36 and a second thermistor 38 connected in series between node A and node B of the bridge. Circuit 40 is isolated from network 30 by buffer 39. As will be recognized, resistors 32, 36 have a positive temperature coefficient of resistance while thermistors 34, 38 have a negative temperature coefficient of resistance.

In a reference arm of bridge circuit 40 are resistors 42 and 44 connected in series in one diagonal and a resistor 46 in a second diagonal. In the variable arm of the bridge circuit are a resistor 52 and a variable resistance 54 connected in series in one diagonal and a resistor 56 and a variable resistance 58 connected in series in another diagaonal. A resistor 62 is connected in parallel across one or the other of the variable resistances 54, 58. Illustratively, the variable resistances are produced by strain gauges mounted on opposite sides of a flexible object as shown, for example, in the above-referenced patent application of Birger Gabrielson. In this position flexing of the object produces tensile loading on one gauge and a compressive loading on the other gauge, thereby producing changes in resistance of approximately equal magnitude but opposite sign. Advantageously, the strain gauges are made of semiconductor devices, with the result that their resistance and their sensitivity vary appreciably with temperature as well as stress. In contrast, over the operating temperatures of interest, resistors 32, 36, 42, 44, 46, 52, 56, 62 have a substantially constant value and in normal operation of the circuit are not subjected to stress. By way of example, the strain gauges may be DSC cartridges available from Kistler-Morse Inc. of Bellevue, Washington and the resistors may be conventional metal film or wire-wound resistors.

Amplifier 70 is a high-gain differential amplifier. One input terminal to amplifier 70 is connected to node C between variable resistances 54, 58 and the other input terminal is connected to node D between resistors 44, 46. The output of amplifier 70 is applied to the base electrode of transistor 75 to regulate current flow therethrough. As shown in the drawing, the emitter and collector terminals of transistor 75 are connected between terminals E and B of the circuit. Thus, current flow through the two wire line 120 is regulated by transistor 75 in accordance with the output signal from amplifier 70. Feedback is provided by resistor 85 connected between node F and the noninverting terminal of amplifier 70.

Between node F and node B, a selector switch 98 connects one of scaling resistors 92, 94, 96 in the path of current flow through two wire line 120. As their name suggests, these scaling resistors in conjunction with feedback resistor 85 permit the same output signal on line 120 to represent different voltages at the inputs to amplifier 70. For example, a four milliamp output signal might correspond to zero pressure differential in all cases, but when switch 98 connects resistor 92 in the circuit a 20 milliamp output signal might correspond to a 20 pounds per square inch pressure differential and when the switch connects resistor 94 in the circuit such an output signal might correspond to a 40 pounds pressure differential.

Constant current source 80 is connected between node B and a node between resistors 42, 44 in the bridge circuit. As will be described below, generator 80 may be used to suppress or modify the zero level in the variable being sensed by the bridge circuit. In particular by applying current from source 80 to the node between resistors 42, 44 the four milliamp output signal can be made to correspond to a non-zero value of the variable being sensed.

As discussed more fully in the above-identified application of Howard R. Branch, III, the resistance values of resistors 52, 56, 62 are selected by an iterative process so as to achieve temperature compensation at three different temperatures and span compensation at two different stresses at the two extreme values of said three temperatures. More particularly, the sum of the resistance of resistors 52, 56 is intially selected to provide for span compensation at first and second stresses at first and second temperatures. To provide for temperature compensation, the value of resistor 62 and its location across variable resistance 54 or 58 and a portion of the resistance of one of resistors 52, 56 is chosen to produce substantially the same output from the bridge circuit at zero stress and the first temperature as is produced at zero stress and the second temperature. In addition, to provide for temperature compensation at a third temperature value, the resistances of resistors 52, 56, 62 are selected in an iterative process which also assures that the bridge circuit produces the same output at zero stress and a third temperature that is produced at zero stress and the first and second temperatures.

Figure 2:
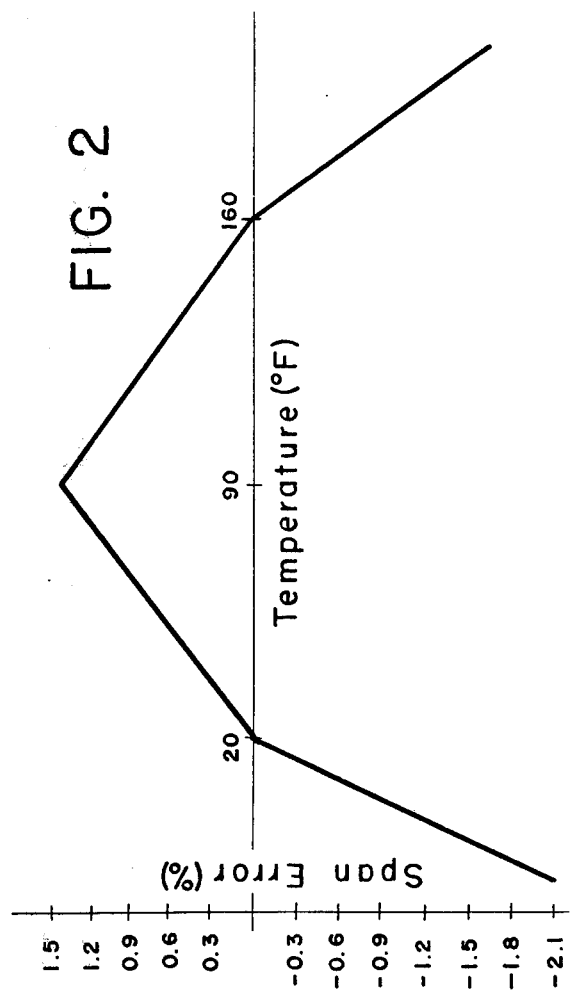

As indicated above, however, this process provides span compensation at only two temperatures. Typically, between these two temperatures there is a positive span error which increases gradually to a point about midway between the two temperatures and decreases thereafter. Below the lower temperature there typically is a negative span error which increases in magnitude as the temperature decreases; and above the upper temperature there likewise is a negative span error which increases in magnitude as temperature increases. A typical plot of span error that is observed when there is span compensation at $-7°$ C. ($20°$ F.) and $71°$ C. ($160°$ F.) is shown in FIG. 2. For this plot, maximum positive span error occurs at approximately $32°$ C. ($90°$ F.).

I have found that these span errors can be minimized by using span compensation network 30 to vary the voltage applied to bridge circuit 40. The values of resistors 32, 36 and thermistors 34, 38 are chosen so that the two resistors essentially determine the voltage applied to the bridge circuit at that temperature at which the span error is a maximum. The values of resistors 32, 36 are selected so that there is substantially no span error at this intermediate temperature. Since thermistor 38 has a negative temperature coefficient of resistance, the resistance of the series combination of resistor 36 and thermistor 38 increases with decreasing temperature, thereby increasing the voltage applied to bridge circuit 40. The value of thermistor 38 and its temperature coefficient of resistance are selected so that this increase in voltage tends to offset the changes in span voltage at temperature less than the intermediate temperature. Since thermistor 34 has a negative temperature coefficient of resistance the resistance of the parallel combination of resistor 32 and thermistor 34 decreases with increasing temperature thereby causing the voltage applied to bridge circuit 40 to increase. The value of thermistor 34 and its temperature coefficient of resistance are selected so that this increase in voltage tends to offset the changes in span voltage at temperatures greater than the intermediate temperature.

Since span errors differ between individual strain gauges, the selection of appropriate values of resistors 32, 36 must be done empirically. Typical values of these resistors are set forth in Table I for the indicated ranges in span error.

Table I

| Span Error | Resistor 32 | Resistor 36 |
|---|---|---|
| 1.5 to 2.25% | 12.1 K ohms | 165 K ohms |
| 2.25 to 2.75 | 14.7 K ohms | 145 K ohms |
| 2.75 to 3.50 | 14.3 K ohms | 137 K ohms |
| 3.50 to 4.50 | 15.0 K ohms | 118 K ohms |

For the span compensation networks whose parameters are set forth in Table I, the voltage produced by voltage regulator 25 is 6.9 volts; and thermistor 34 is a Model FP52J1 and thermistor 38 is a model KP41J2 manufactured by Fenwall Electronics of Framingham, Mass. Thermistor 34 has a resistance of 200K ohms at $25°$ C. and a negative temperature coefficient of resistance of 4.9%/C°. At $70°$ C. its resistance is 28K ohms. Thermistor 38 has a resistance of 10K ohms at 25° C. and the same temperature coefficient of resistance.

In bridge circuit 40 illustrative resistance values in the reference arm of the bridge are 2K ohms for resistor 42, 16.8K ohms for resistor 44 and 23K ohms for resistor 46. As indicated above, the values in the sensing arm of the bridge depend on the properties of the variable resistance elements 54, 58. For the case of semiconductor strain gauges, the resistance of each strain guage is typically about 1K ohms. The total resistance needed for span compensation at the two extreme temperature values is typically on the order of 700ohms. The additional series resistance which is required for temperature compensation is about 10ohms and the parallel resistor 62 is typically in excess of 100K ohms. For convenience, the additional series resistance can be incorporated into one of resistors 52, 56; and this additional series resistance will accordingly be described as a portion of one of these resistors in the claims below. While the incorporation of this additional series resistance in the variable arm of the bridge does affect the series resistance in that arm between nodes A and B, the effect is small compared with the total resistance of resistors 52, 56. As a result, there is substantially no effect (usually less than 0.1% change) on span compensation.

For the illustrative circuit values enumerated above, typical values of the scaling resistors are approximately 20, 40, and 80 ohms; and a typical value of feedback resistor 85 is 73.3K ohms.

Constant current sources 20, 80, amplifier 70 and transistor 75 can be implemented using many different alternatives. Amplifier 70 preferably is implemented in the form of a high gain differential amplifier followed by an amplifier stage which drives transistor 75.

The reference voltage at node D is that voltage which will produce a minimum current output signal when the variable sensed by the bridge circuit is at zero. For the case of a strain gauge this zero level is the unstressed condition. The reference voltage level is, of course, determined by the supply voltage applied to the bridge circuit and the voltage drops across resistors 42, 44, 46. For the circuit parameters in the illustrative example being discussed, the current output from source 80 is approximately 150 microamps which develops a voltage drop of 0.3 volts across resistor 42. Accordingly, the reference voltage level at node D can be shifted approximately 0.2 volts by use of constant current source 80. Thus, the minimum output signal will be produced only when the gauge is stressed; and the zero level is suppressed. Alternatively, the zero level can be raised simply by reversing the direction of current flow through resistor 42 and source 80. By adjusting the output of constant current source 80, it is possible to vary the amount of stress that is required to produce the minimum current output signal. To minimize calibration problems this is preferably done as a factory adjustment.

Figure 3:
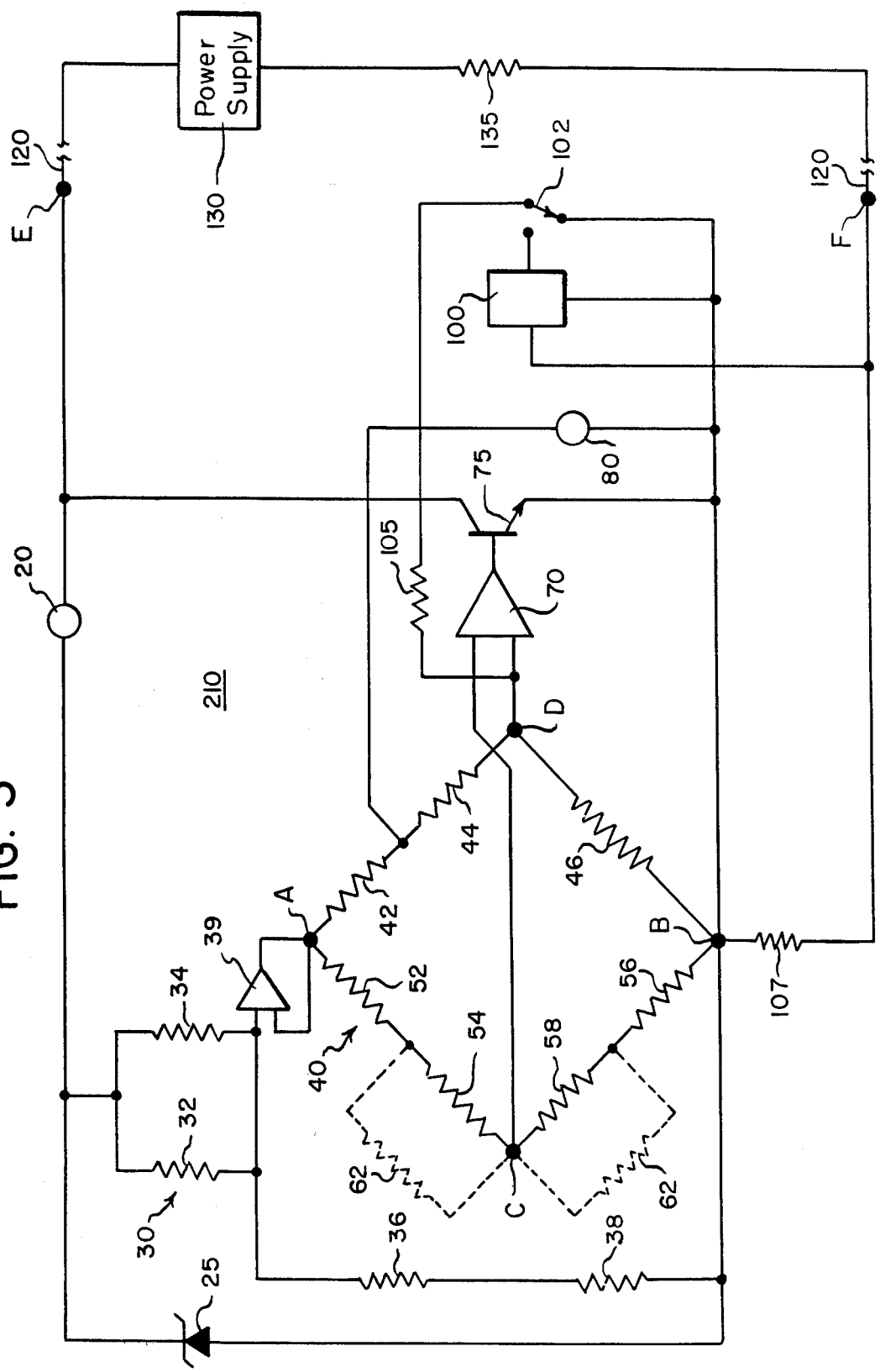
FIG. 3 is a block diagram of a second illustrative embodiment of my invention.

FIG. 3 depicts a second illustrative embodiment of my invention. Circuit 210 comprises a constant current source 20, a voltage regulator 25, a span compensation network 30, a temperature compensated bridge circuit 40, an amplifier 70, a transistor 75, a second constant current source 80, a function generator 100, a feedback resistor 105 and an output resistor 107. Circuit 210 is connected at terminals E and F to a two wire line 120 which connects a power supply 130 and a resistive load 135 to circuit 210. For the most part, circuit 210 comprises the same elements found in circuit 10 and these elements have been numbered accordingly and will not be discussed further.

Function generator 100 is connected between output node F and feedback resistor 105 which is connected to the non-inverting input terminal of amplifier 70. Switch 102 permits feedback resistor 105 to be connected to the output of generator 100 or to node B of the bridge circuit. When the function generator is connected to the feedback resistor the output of amplifier 70 is proportional to that function of the input signal to the amplifier which is the inverse of the function produced by the function generator. Preferably, function generator 100 is a squaring circuit so that the output signal from amplifier 70 is proportional to the square root of the signal at its input. This is useful in calculating values such as fluid flow which is proportional to the square root of a pressure differential which could be measured by strain gauges.

Constant current source 80 of circuit 210 is used to calibrate squaring circuit 100. For the circuit shown in circuit 210, function generator 100 has a non-zero output at the output signal level on line 120 which corresponds to the zero level in the variable sensed by the bridge circuit. This non-zero output from generator 100 is offset by using constant current source 80 to modify the reference voltage at node D in the same fashion as source 80 is used to suppress the zero level in the circuit of FIG. 1.

As will be apparent to those skilled in the art, my invention is not limited to the specific circuits described above. Numerous other embodiments will be apparent to those skilled in the art. Of particular interest it should be noted that numerous functions may readily be implemented in function generator 100 so as to produce the desired inverse functions in the output signal. The particular point at which constant current source 80 is connected to the bridge circuit is only illustrative. The connection can be made at any point such that there is a non-zero resistance between that point and both node A and node B of the bridge. If desired the constant current source could be conected directly to node D.

What is claimed is:

1. An electrical circuit comprising:
   a bridge circuit comprising:
      first and second electrical elements connected in series in a first arm of the bridge circuit between first and second input nodes, said first and second electrical elements having a resistance which varies as a function of at least two variables;
      third and fourth electrical elements connected in series in a second arm of the bridge circuit between said first and second input nodes; fifth and sixth electrical elements connected in series between said first and second input nodes, said fifth electrical element having a positive coefficient of resistance with respect to a first one of said two variables and said sixth electrical element having a negative coefficient of resistance with respect to said first variable;
   a regulated voltage supply having first and second terminals, said first terminal being connected to said first input node of the bridge circuit;
   seventh and eighth electical elements connected in parallel between said second terminal of the voltage supply and said second input node of the bridge circuit, said seventh electrical element having a positive coefficient of resistance with respect to said first variable and said eighth electrical element having a negative coefficient of resistance with respect to said first variable;

means for producing an output signal from said bridge circuit, said means having first and second inputs, said first input being connected to a first output node of the bridge circuit between said first and second electrical elements and said second input being connected to a second output node of said bridge circuit between said third and fourth electrical elements;

and a constant current source connected between said first input node and a point in the second arm of the bridge circuit such that there is a non-zero resistance between said point and the first and second input nodes.

2. The electrical circuit of claim 1 wherein the circuit is adapted to be powered by a DC source over a two wire line and to provide an output signal over the same line, said circuit further comprising:

first and second circuit terminals connected to said two wire line;

means for connecting said regulated voltage supply between said first and second circuit terminals; and a current regulator, connected between said first and second circuit terminals and connected to said output signal producing means, said current regulator controlling the flow of current in said two wire line in response to the output signal from said output signal producing means.

3. The electrical circuit of claim 2 further comprising feedback means connected between one of said first and second circuit terminals and one input terminal to said output signal; producing means.

4. The electrical circuit of claim 1 further comprising ninth and tenth electrical elements connected in series with said first and second electrical elements between said first and second input nodes and an eleventh electrical element connected in parallel with one of said first and second electrical elements, said ninth, tenth, and eleventh electrical elements having resistances such that:

the sum of the resistances of the ninth and tenth electrical elements provides for span compensation between first and second values of said second variable at first and second values of said first variable;

the resistance of the eleventh electrical element and a portion of the resistance of one of the ninth and tenth electrical elements provide for substantially the same output at said first and second values of said first variable; and the resistances of said ninth, tenth, and eleventh electrical elements are selected to provide for substantially the same output at a third value of the first variable as at said first and second values of said first variable.

5. The electrical circuit of claim 4 wherein said fifth, sixth, seventh and eighth electrical elements are selected so as to provide for span compensation between the first and second values of said second variable at a value of the first variable between said first and second values of the first variable.

6. The electrical circuit of claim 1 further comprising:

first and second circuit terminals, said first and second terminals of said regulated voltage supply being connected between said first and second circuit terminals, respectively;

feedback means having a first terminal connected to one input terminal to the output signal producing means;

function generating means having an input terminal connected to said first circuit terminal and an output terminal connected to a second terminal of said feedback means.

7. The electrical circuit of claim 6 wherein said function generating means is a squaring circuit, whereby the output signal from said output signal producing means is proportional to the square root of its input signal.

8. The electrical circuit of any one of claims 1 through 7 wherein said first variable is temperature and said second variable is stress and said first and second electrical elements are strain gauges.

9. An electrical circuit comprising:

a bridge circuit comprising:

first and second electrical elements connected in series in a first arm of the bridge circuit between first and second input nodes, said first and second electrical elements having a resistance which varies as a function of at least two variables;

third and fourth electrical elements connected in series in a second arm of the bridge circuit between said first and second input nodes;

a regulated voltage supply having first and second terminals connected to said first and second input nodes of the bridge circuit;

means for producing an output signal from said bridge circuit, said means having first and second inputs, said first input being connected to a first output node of the bridge circuit between said first and second electrical elements and said said second input being connected to a second output node of said bridge circuit between said third and fourth electrical elements; and a constant current source connected between said first input node and a point in the second arm of the bridge circuit such that there is a non-zero resistance between said point and the first and second input nodes.

10. The electrical circuit of claim 9 wherein the circuit is adapted to be powered by a DC source over a two wire line and to provide an output signal over the same line, said circuit further comprising:

first and second circuit terminals connected to said two wire line;

means for connecting said regulated voltage supply between said first and second circuit terminals; and a current regulator, connected between said first and second circuit terminals and connected to said output signal producing means, said current regulator controlling the flow of current in said two wire line in response to the output signal from said output signal producing means.

11. The electrical circuit of claim 10 further comprising feedback means connected between one of said first and second circuit terminals and one input terminal to said output signal producing means.

12. The electrical circuit of claim 9 further comprising fifth and sixth electrical elements connected in series with said first and second electrical elements between said first and second input nodes and a seventh electrical element connected in parallel with one of said first and second electrical elements, said fifth, sixth and seventh electrical elements having resistances such that:

the sum of the resistances of the fifth and sixth electrical elements provides for span compensation between first and second values of said second variable at first and second values of said first variable;

the resistance of the seventh electrical element and a portion of the resistance of one of the fifth and sixth electrical elements provide for substantially the same output at said first and second values of said first variable; and the resistances of said fifth, sixth and seventh electrical elements are selected to provide for substantially the same output at a third value of the first as at said first and second values of said first variable.

13. The electrical circuit of claim 12 wherein said fifth, sixth and seventh electrical elements are selected so as to provide for span compensation between the first and second values of said second variable at a value of the first variable between said first and second values of the first variable.

14. The electrical circuit of claim 9 further comprising:

first and second circuit terminals, said first and second terminals of said regulated voltage supply being connected between said first and second circuit terminals, respectively;

feedback means having a first terminal connected to one input terminal to the output signal producing means; and function generating means having an input terminal connected to said first circuit terminal and an output terminal connected to a second terminal of said feedback means.

15. The electrical circuit of claim 14 wherein said function generating means is a squaring circuit, whereby the output signal from said output signal producing means is proportional to the square root of its input signal.

16. The electrical circuit of any one of claims 9 through 15 wherein said first variable is temperature and said second variable is stress and said first and second electrical elements are strain gauges.

17. An electrical circuit comprising:

a bridge circuit comprising:

first and second electrical elements connected in series between first and second input nodes, said first and second electrical elements having a resistance which varies as a function of at least two variables;

third and fourth electrical elements connected in series between said first and second input nodes;

fifth and sixth electrical elements connected in series between said first and second input nodes, said fifth electrical element having a positive coefficient of resistance with respect to a first one of said two variables and said sixth electrical element having a negative coefficient of resistance with respect to said first variable;

a regulated voltage supply having first and second terminals, said first terminal being connected to said first input node of the bridge circuit;

seventh and eighth electrical elements connected in parallel between said second terminal of the voltage supply and said second input node of the bridge circuit, said seventh electrical element having a positive coefficient of resistance with respect to said first variable and said eighth electrical element having a negative coefficient of resistance with respect to said first variable; and means for producing an output signal from said bridge circuit, said means having first and second inputs, said first input being connected to a first output node of the bridge circuit between said first and second electrical elements and said second input being connected to a second output node of said bridge circuit between said third and fourth electrical elements.

18. The electrical circuit of claim 17 further comprising ninth and tenth electrical elements connected in series with said first and second electrical elements between said first and second input nodes and an eleventh electrical element connected in parallel with one of said first and second electrical elements, said ninth, tenth and eleventh electrical elements having resistances such that:

the sum of the resistances of the ninth and tenth electrical elements provides for span compensation between first and second values of said second variable at first and second values of said first variable;

the resistance of the eleventh electrical element and a portion of the resistance of one of the ninth and tenth electrical elements provide for substantially the same output at said first and second values of said first variable; and the resistances of said ninth, tenth and eleventh electrical elements being selected to provide for substantially the same output at a third value of the first variable as at said first and second values of said first variable.

19. The electrical circuit of claim 18 wherein said fifth, sixth, seventh and eighth electrical elements are selected so as to provide for span compensation between the first and second values of said second variable and a value of the first variable between said first and second values of the first variable.

20. The electrical circuit of any one of claims 17, 18 and 19 wherein said first variable is temperature and said second variable is stress and said first and second electrical elements are strain gauges.

* * * * *